UNITED STATES PATENT OFFICE.

CHARLES W. TRIGG, OF PITTSBURGH, PENNSYLVANIA, ASSIGNOR TO JOHN E. KING, OF DETROIT, MICHIGAN.

PROCESS FOR RECOVERY OF AROMATIC AND FLAVORING CONSTITUENTS.

1,367,724.      Specification of Letters Patent.      Patented Feb. 8, 1921.

No Drawing.     Application filed November 19, 1917. Serial No. 202,763.

*To all whom it may concern:*

Be it known that I, CHARLES W. TRIGG, a citizen of the United States, residing at Pittsburgh, in the county of Allegheny, State of Pennsylvania, have invented a new and useful Improvement in Processes for Recovery of Aromatic and Flavoring Constituents, of which the following is a specification.

This discovery relates to the restoring of the escaping volatile aromatic and flavoring constituents of foods, adjuvant foods and other organic substances mostly lost during evaporation to the resulting concentrates or dried powders of the substances treated. The discovery is more particularly directed to the preparation of a pulverulent, or molded solid water-soluble coffee extract which will contain substantially all the aromatic and flavoring constituents of the roasted coffee-bean.

It is a desideratum in making water-soluble coffee extracts to retain the coffee aromas (sometimes spoken of as the caffeol) unimpaired so as to make possible the making of a coffee beverage from the concentrate which is substantially a duplication of coffee beverage made from the coffee-bean. However, as I am informed, this desideratum has not been realized. It is to more nearly achieve this desideratum that my discovery is directed.

The process consists of infusing roasted ground coffee with water at the desired temperature; the coffee infusion is then separated from the grounds, and the clear solution then evaporated in any of the well known manners, such as, boiling, vacuum drum drying, spraying *in vacuo*, etc.

The distillate or vapors passing off the coffee solution during this evaporation or for that matter during preparation of the infusion, are condensed by the usual way and the condensate caught in a receptacle that I call a trap. This distillate contains moisture and steam-distilling and heat-distilling, aromatic and flavoring, constituents of coffee (sometimes referred to as caffeol or essential oils, etc.) This moisture, upon being cooled, condensed and collected, retains or carries down mechanically a goodly portion of the steam-distilled and heat-vaporized volatile, aromatic and flavoring compounds.

To recover these desirable compounds from the aqueous condensate, the latter is subjected to extraction with a solvent, preferably an immiscible, low-boiling point, substantially odorless, tasteless, high-extractive power volatile solvent, such as butane, pentane, ethyl chlorid, methyl chlorid, etc. The extraction may be carried out in any known and approved extraction apparatus, by shaking, agitation or stirring, under pressure or without as may be necessary, or at any temperature that may be required.

The aqueous layer is separated from the solvent and the water is re-used for the extraction of fresh coffee, if so desired. The solvent containing the aromatic and flavoring compounds is then added to the dry powdered extract which will always result from complete evaporation, and the solvent evaporated as quickly, non-violently, and at as low a temperature as possible. The vaporizing solvent may be caught and condensed for re-use.

The aroma may be kept in the powdered extract by caking the same and covering it with some physiologically inactive, water-soluble, non-hygroscopic, impermeable, coating.

This process preserves the constituents of the coffee-berry including the caffeol in their natural state and there is no decomposition nor chemical change in the constituents such as take place in dry or destructive distillation and in steam distillation.

What I claim is:

1. The process of making an aromatized coffee-extract, which consists in preparing a natural infusion of completely roasted ground coffee, evaporating the infusion, recovering the caffeol from the distillate with a solvent, and adding the caffeol to the extract resulting from the evaporation of the infusion.

2. The process of making an aromatized coffee-extract, which consists in preparing an infusion of completely roasted ground coffee, evaporating the infusion to produce an extract, condensing the vapors resulting from the evaporation, separating the caffeol from the condensate by a caffeol solvent, and adding the caffeol to the extract resulting from the evaporation of the infusion, the caffeol solvent being separated from the caffeol.

3. The process of making an aromatized coffee-extract which consists in preparing an infusion of completely roasted ground coffee, evaporating the infusion, condensing the vapors resulting from the evaporation, separating the caffeol from the condensate, and adding the caffeol to the coffee-extract.

4. The process of making an aromatized coffee-extract which consists in preparing an infusion of completely roasted ground coffee, evaporating the infusion, condensing the vapors resulting from the evaporation, separating the caffeol from the condensate by a caffeol solvent, and adding the caffeol to coffee-extract, the caffeol solvent being separated from the caffeol before the aromatized coffee-extract is completed.

In witness whereof I have hereunto set my hand on the 10th day of November, 1917.

CHARLES W. TRIGG.